United States Patent
Namma et al.

(10) Patent No.: US 6,185,616 B1
(45) Date of Patent: Feb. 6, 2001

(54) PROXY SERVER APPARATUS, A PROXY SERVER SYSTEM, AND A SERVER APPARATUS

(75) Inventors: Eimei Namma, Tokyo; Tomomi Kaga, Kawasaki, both of (JP)

(73) Assignee: Matsushita Electric Industrial Co., Ltd. (JP)

( * ) Notice: Under 35 U.S.C. 154(b), the term of this patent shall be extended for 0 days.

(21) Appl. No.: 08/897,323

(22) Filed: Jul. 21, 1997

(30) Foreign Application Priority Data

Aug. 23, 1996 (JP) .................................... 8-222123

(51) Int. Cl.[7] ....................................... G06F 15/16
(52) U.S. Cl. ............................. 709/227; 709/225
(58) Field of Search ................................ 709/227, 249, 709/219, 217, 218, 228, 225; 370/352; 713/201

(56) References Cited

U.S. PATENT DOCUMENTS

| | | | |
|---|---|---|---|
| 5,617,540 | * 4/1997 | Civanlar et al. | 709/227 |
| 5,737,333 | * 4/1998 | Civanlar et al. | 370/352 |
| 5,745,702 | * 4/1998 | Morozumi | 709/249 |
| 5,812,819 | * 9/1998 | Rodwin et al. | 713/201 |

OTHER PUBLICATIONS

Ed Krol, The Whole Internet User's Guide & Catalog, O'Reilly & Associates, Inc., p. 361, May 1993.*

Baccala, B., ed., "Connected: An Internet Encyclopedia" [online], 3rd ed.., "The Point–to–Point Protocol (PPP)", [retrieved on Jun. 24, 1999], retrieved from Internet, <URL: http://www.FreeSoft.org/CIE/RFC/1661/index.htm>, Apr. 1997.*

Baccala, B., ed., "Connected: An Internet Encyclopedia" [online], 3rd ed., "SLIP Protocol Overview", [retrieved on Jul. 12, 1999], retrieved from the Internet, <URL: http:www.FreeSoft.org/CIE/Topics/63.htm, Apr. 1997.*

Baccala, B., ed., "Connected: An Internet Encyclopedia" [online], 3rd ed., "RFC 2131: Introduction", [retrieved on Jun. 24, 1999], retrieved from the Internet <URL: http//www.FreeSoft.org/CIE/RFC/2131/1.htm>, Apr. 1997.*

(List continued on next page.)

*Primary Examiner*—Kenneth R. Coulter
*Assistant Examiner*—Patrice L. Winder
(74) *Attorney, Agent, or Firm*—Parkhurst & Wendell, L.L.P.

(57) ABSTRACT

A proxy server apparatus (APP) coupled to a network and a TEL network is disclosed, which comprises: a receiving portion for receiving a request, from a client terminal coupled to the network, for connection to a desired server APP therethrough via the TEL network, the request including a name of the server; an address table for storing the name and corresponding TEL NO.; a PPP connection portion for dynamically assigning an IP address to the desired server APP from the name according to the address table and for providing PPP connection between the desired server APP and the proxy server APP; and a COMM providing portion for providing communication between the client terminal and the desired server APP using the IP address. A proxy server system including a plural proxy server APP is also disclosed, wherein a request is forwarded to a desired server according to a proxy server arrangement table in each proxy server APP and communication is routed through other server APP. The proxy server arrangement table is determined according to distance in TEL network or data rate of the proxy server APP. A server APP is disclosed which informs the proxy server coupled thereto of disconnection when all circuits to the proxy server are in non communication condition for a predetermined interval.

10 Claims, 8 Drawing Sheets

OTHER PUBLICATIONS author unknown, CCS Web Central Survival Guide for the Internet, "Difference Between SLIP and PPP", [retrieved on Jun. 24, 1999], retrieved from the Internet < URL:http://www.ccsi.com/survival–kit/> , Jul. 1996.*

Stephen A. Thomas, IPng and the TCP/IP Protocols: Implementing the Next Generation Internet, Wiley Computer Publishing, pp. 21–26, Jan. 1996.*

* cited by examiner

FIG. 3

| SERVER NAME | IP ADDRESS | TEL NO. |
|---|---|---|
| NANMA | 133.185.001.001 | 03-1234-5678 |
| KAGA | 133.185.001.002 | 03-9012-3456 |
| YAMADA | | 03-7890-1234 |
| | | |

FIG. 4

| CLIENT IP ADDRESS | COMM COND | NON-COMM TIME (MIN) |
|---|---|---|
| 133.185.001.001 | COMM | 0 |
| 133.185.001.002 | COMM | 0 |
| 133.185.001.003 | NON-COMM | 30 |
| 133.185.001.004 | NON-COMM | 10 |
| | | |

FIG. 7

| SERVER NAME | PROXY SERVER NAME |
|---|---|
| NANMA | TOKYOSV |
| KAGA | TOKYOSV |
| YAMADA | TOKYOSV |
| SATO | YOKOHAMASV |
| KATO | YOKOHAMASV |
| TANAKA | CHIBASV |
| SUZUKI | CHIBASV |
|  |  |

FIG. 9
PRIOR ART

| NAME | IP ADDRESS |
|---|---|
| NANMA | 133.185.001.001 |
| KAGA | 133.185.001.002 |
| YAMADA | 133.185.002.001 |
| SATO | 133.186.001.001 |
| KATO | 133.186.002.001 |
| TANAKA | 133.190.001.001 |
| SUZUKI | 133.200.001.001 |
|  |  | ns
PROXY SERVER APPARATUS, A PROXY SERVER SYSTEM, AND A SERVER APPARATUS

BACKGROUND OF THE INVENTION

1. Field of the Invention

This invention relates to a proxy server apparatus for providing communication between a network and a server via a public telephone network connected to the server, a proxy server system including a plurality of server apparatuses, and the server coupled to the network via the proxy server and the public telephone network.

2. Description of the Prior Art

Generally, in the TCP/IP communication, when a client requests connection to a server, a connection can be provided by specifying the IP address of the server. However, due to the popularization of the Internet, the network becomes big and there are many servers, so that it becomes difficult to control all IP addresses of servers. Thus, DNS (Domain Name Services) has been developed.

A DNS server searches an IP address from the specified name of the server. Thus, when connection is made to a server without directly specifying the IP address of the server a DNS server searches the corresponding IP address from specified name of the server. FIG. 9 is a prior art table controlled by the DNS server. In the DNS, names of servers coupled to the network correspond IP addresses one to one, that is, the IP addresses have been determined in advance.

In that structure, it is necessary that the server has an IP address previously determined and is always connected to the network. If the server is provided within a public area, there is no problem in this structure. However, if a server is provided in a home, it is necessary to connect to the network through a public telephone network and if it is always connected to the network, a telephone charge is high. When a server in a home, the number of times of accessing per unit interval is not so high. Accordingly, it is desirable desired to connect the server to the network only when there is a necessity for connection to suppress the telephone charge.

Moreover, in the case that the general home use computer is connected to a network through a public telephone network, the PPP (Point to Point Protocol) is used. In the PPP connection, because the number of the IP addresses is limited, the home use computer does not have IP addresses and an IP address is dynamically assigned to a home use computer on connection and the address is used only while the computer is connected to the network.

SUMMARY OF THE INVENTION

The aim of the present invention is to provide an improved proxy server apparatus, an improved proxy server system, and an improved server apparatus.

According to the present invention, a first proxy server apparatus coupled to a network and a public telephone network is provided which comprises: a receiving portion for receiving a request from a client terminal coupled to the network, for connection to a desired server apparatus via the public telephone network, the request including a name of the server; an address table for storing the name and corresponding telephone number; a point-to-point protocol connection portion for dynamically assigning an Internet protocol address from predetermined Internet protocol addresses used in the network to the desired server apparatus from the name in accordance with the address table and for providing point-to-point protocol connection between the desired server apparatus and the proxy server apparatus; and a communication providing portion for providing communication between the client terminal and the desired server apparatus using the Internet protocol address.

In the first proxy server, the communication providing portion may further provide communication between any other client terminals and the desired server apparatus using the Internet protocol address in response to another request from any other client terminals while the Internet protocol address is assigned to the desired server apparatus.

In the first proxy server, the point-to-point protocol connection portion may release the Internet protocol address in response to a disconnection information from the desired server apparatus.

According to the invention, a second proxy server apparatus coupled to a network controlled with Internet protocol addresses and a public telephone network is provided which, comprises: a request receiving portion for receiving a request from a client terminal through the network for communicating with a server apparatus to be coupled to a network through the network and the public telephone network; a connection condition control table for storing a name of the server apparatus and the corresponding telephone number in the public telephone network and correspondingly storing Internet protocol addresses while the server apparatus are connected thereto; a connection condition controlling portion for checking whether the server apparatus is connected to the network in accordance with the connection condition control table; a point-to-point protocol connection portion for dynamically assigning one of the Internet protocol addresses to the server apparatus if the server apparatus is not being connected to the network by checking the connection condition controlling portion and for providing a point-to-point connection if the server apparatus is not being connected to the network; a data communication portion for providing data communication with the one of server apparatus with the dynamically assigned the one of Internet protocol address; and a request response portion for transmitting a communication result from the data communication portion as a reply in response to the communication request to the client terminal.

In the second proxy server apparatus, the connection control portion receives a disconnection request from the server apparatus and releases the Internet protocol address corresponding to the server apparatus.

According to the invention, a proxy server system including a plurality of proxy server apparatus coupled to a network controlled with Internet protocol addresses and a public telephone network is provided, each proxy server apparatus comprising: a proxy server apparatus arrangement table for representing corresponding relations between names of a plurality of server apparatus and names of a plurality of server apparatus in charge of the plurality of proxy server apparatus; a receiving portion for receiving a request, from a client terminal coupled to the network directly or via another one of the plurality of proxy server apparatus, for connection to one of the plurality of server apparatus; a forwarding portion for forwarding the request to one of the proxy server apparatus in charge of the one of the plurality of server apparatus through the network in accordance with the proxy server apparatus arrangement table when the one of the plurality of server apparatus is not in charge of this proxy server apparatus; an address table for storing the name and the corresponding telephone number of the one of the plurality of server apparatus in charge of this proxy server apparatus; a point-to-point protocol connection portion for dynamically assigning an Internet protocol address from predetermined Internet protocol addresses to the one of the plurality of server apparatus from the name in accordance with the address table and for providing a point-to-point protocol connection between the one of server apparatus and this proxy server apparatus, when the one of the plurality of server apparatus is in charge of this proxy server apparatus; and a communication providing portion for providing communication between the client terminal and the one of the plurality of server apparatus using the Internet protocol address.

In the proxy server system, the proxy server apparatus arrangement table is determined in accordance with distances in the public telephone network between the server apparatus and the plurality of proxy server apparatus.

In the proxy server system, the proxy server apparatus arrangement table is determined in accordance with data rates of the plurality of proxy server apparatus.

In the proxy server system, the proxy server apparatus arrangement table is determined in accordance with data rate of the plurality of proxy server apparatus and distances in the public telephone network between the server apparatus and the plurality of proxy server apparatus.

According to the invention, a third proxy server apparatus coupled to a network controlled with Internet protocol addresses and a public telephone network is provided, which comprises: a proxy server apparatus arrangement table for representing corresponding relations between names of the proxy server apparatus and other server apparatus coupled to the network and names of a plurality of server apparatus in charge of the proxy server apparatus and the other proxy server apparatus; a receiving portion for receiving a request, from a client terminal coupled to the network directly or via one of the other proxy server apparatus, for connection to one of the plurality of server apparatus; a forwarding portion for forwarding the request to one of the other proxy server apparatus in charge of the one of the plurality of server apparatus through the network in accordance with the proxy server apparatus arrangement table when the one of the plurality of server apparatus is not in charge of this proxy server apparatus; an address table for storing the name and the corresponding telephone number of the one of the plurality of server apparatus in charge of this proxy server apparatus; a point-to-point protocol connection portion for dynamically assigning an Internet protocol address from predetermined Internet protocol addresses to the one of the plurality of server apparatus from the name in accordance with the address table and for providing a point-to-point protocol connection between the one of server apparatus and this proxy server apparatus, when the one of the plurality of server apparatus is in charge of this proxy server apparatus; and a communication providing portion for providing communication between the client terminal and the one of the plurality of server apparatus using the Internet protocol address.

In the third proxy server apparatus, the communication providing portion provides the communication between the client terminal and the one of the plurality of server apparatus via the another one of the plurality of proxy server apparatus when the request is from the client terminal via the another one of the plurality of proxy server apparatus.

According to this invention, a server apparatus coupled to a network through a point-to-point protocol connection via a public telephone network is provided, which comprises: a timer portion for measuring continuously non-communication conditions of client terminals coupled thereto; and a disconnection control portion for disconnecting the server apparatus from the public telephone network when all client terminals are in a non-communication condition for a predetermined interval.

BRIEF DESCRIPTION OF THE DRAWINGS

The object and features of the present invention will become more readily apparent from the following detailed description taken in conjunction with the accompanying drawings in which:

FIG. 3 is a communication control table, shown in FIG. 1, illustrating relations among server names, IP addresses, and telephone numbers;

FIG. 4 shows a table of the communication condition control table 42 shown in FIG. 1;

FIG. 7 shows a proxy server apparatus arrangement table shown in FIG. 5;

FIG. 9 is a prior art table controlled by the DNS server.

The same or corresponding elements or parts are designated with like references throughout the drawings.

DETAILED DESCRIPTION OF THE INVENTION

<First Embodiment>

Figure 1:
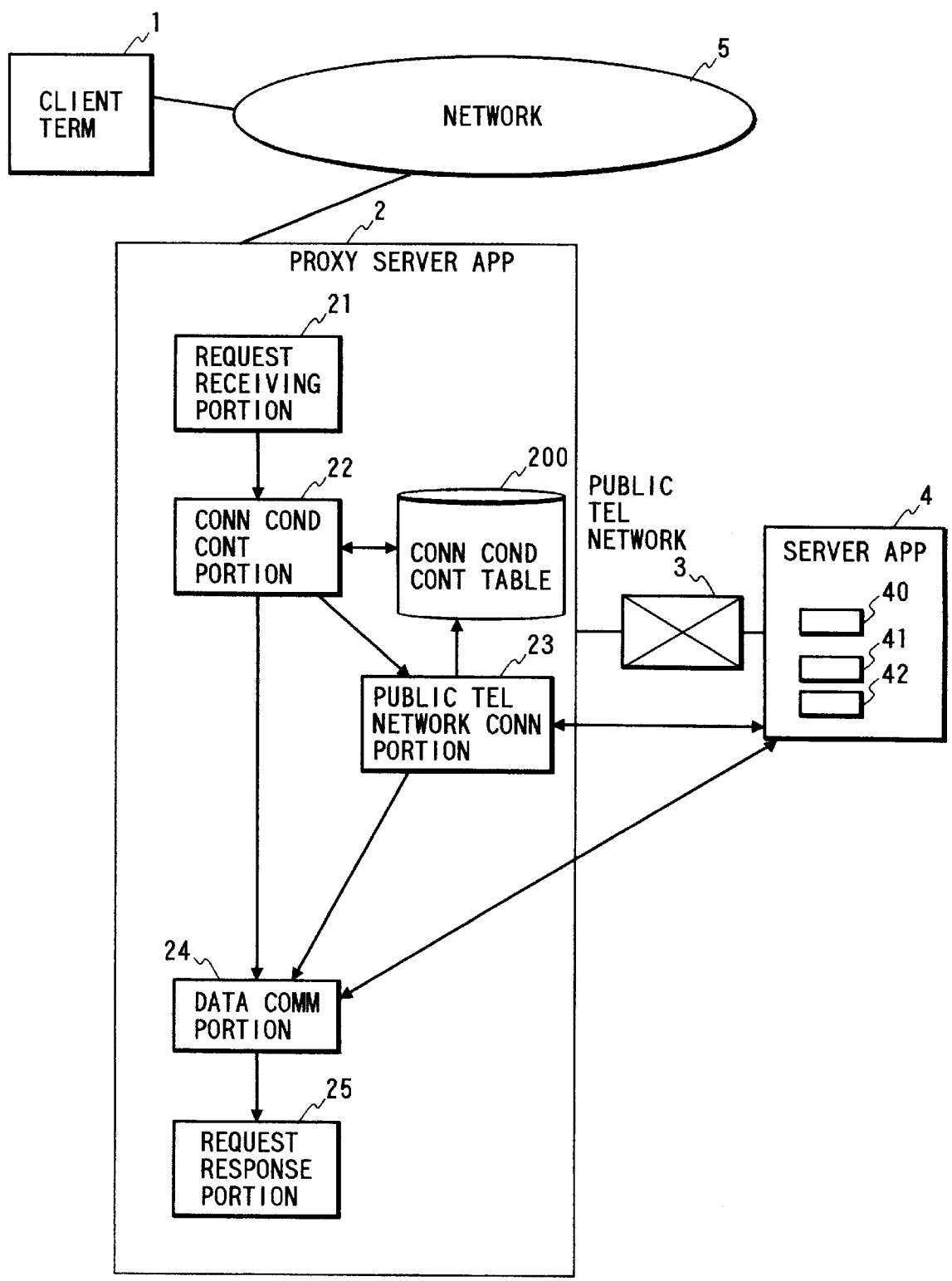
FIG. 1 is a block diagram of a proxy server apparatus and a server of a first embodiment, wherein their communication system is also shown.

FIG. 1 is a block diagram of a proxy server apparatus and a server of a first embodiment, wherein their communication system are also shown.

In FIG. 1, a client terminal 1 is coupled to a network 5, the proxy server apparatus 2 is coupled to the network 5 and a public telephone network 3, and a server 4 is coupled to the proxy server apparatus 2 through the public telephone network 3.

The proxy server apparatus 2 comprises a request receiving portion 21 for receiving a request from the client terminal 1 through the network 5 for requesting a communication with the server apparatus 4, a connection condition control portion 22 for controlling connection to and disconnection from the server apparatus, a public telephone network connection portion 23 for assigning an IP address and providing PPP connection to the server apparatus 4 through the public telephone network 3, a data communication portion 24 for effecting a data communication with the connected server apparatus 4, a request response portion 25 for returning a reply in response to the communication request from the client terminal 1, a connection condition control table 200 for controlling IP addresses dynamically assigned in accordance with a name of a server apparatus and a telephone number corresponding to the name of the server apparatus.

An operation will be described.

Figure 2:
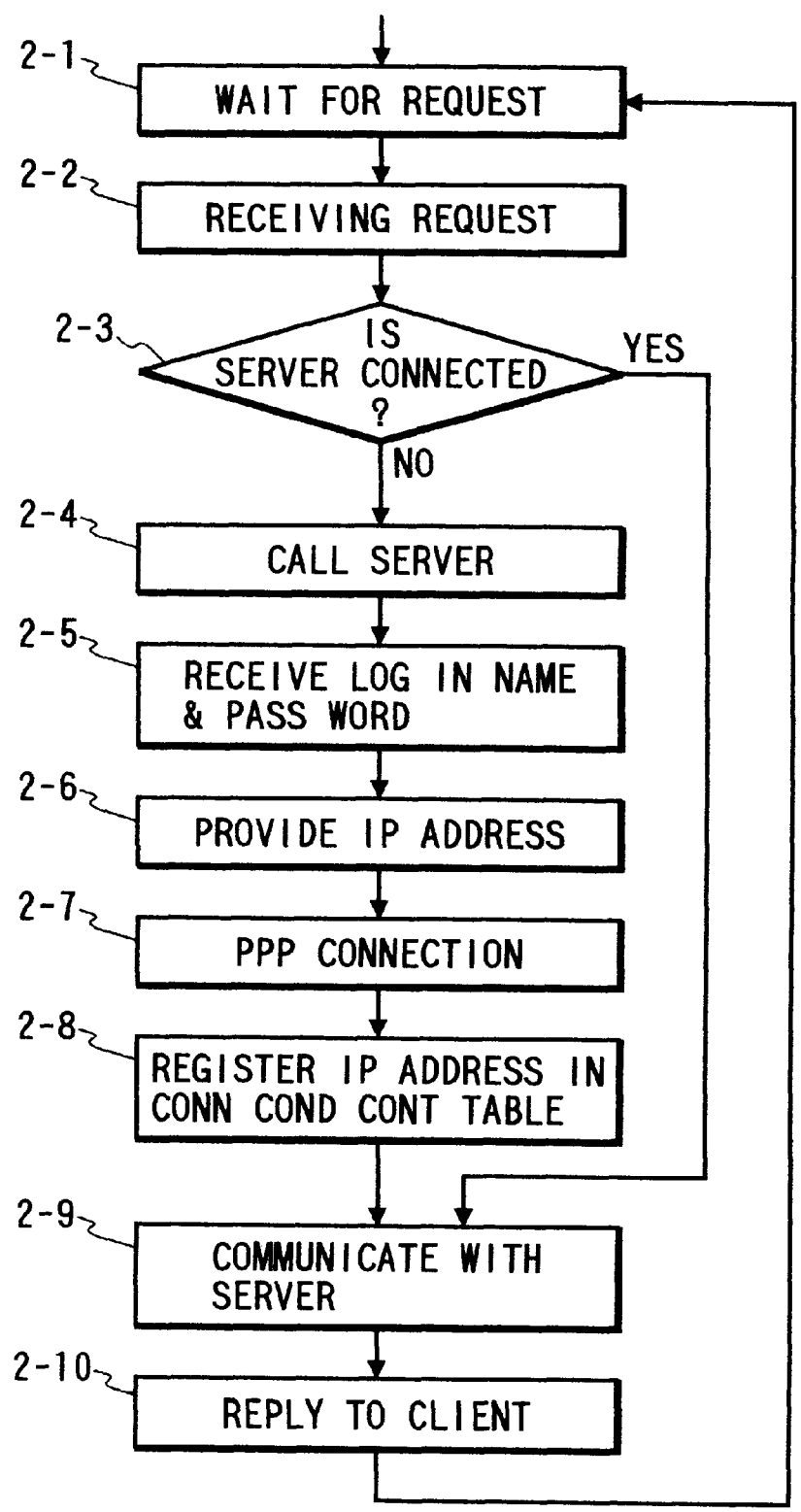
FIG. 2 depicts a flow chart showing an operation of the proxy server apparatus of the first embodiment.

FIG. 2 depicts a flow chart showing an operation of the proxy server apparatus 2 of the first embodiment. FIG. 3 is a communication control table, shown in FIG. 1, illustrating relations among server names, IP addresses, and telephone numbers.

In step 2-1, the proxy server apparatus 2 waits for a communication request with the server apparatus 4 from the client terminal 1 connected to the network 5. When there is the communication request with the server apparatus having name YAMADA, the proxy server apparatus 2 receives the communication request in step 2-2. Then, the proxy server apparatus 2 checks whether the server apparatus 4 is being connected to the network 5 by checking the communication condition control table 200.

As shown in FIG. 3, each row of the connection condition control table shows a name of the server, the corresponding IP address in the network 5, and the corresponding telephone number in the public telephone network 3. In the connection condition control table 200, if there is a value at the column of the IP address, the corresponding server is being connected to the network 5 and if there is no value at the column of the IP address, the corresponding server is not connected to the network. In the case shown in FIG. 3, server apparatus NANMA and server apparatus YAMADA are connected and IP addresses 133.185.001.001 and 133.185.001.002 are assigned. On the other hand, the server apparatus YAMADA is not connected to the proxy server apparatus 2.

In step 2-3, if the server apparatus is connected to the proxy server apparatus 2, a communication with the server apparatus is made in step 2-9.

As mentioned, in this embodiment, it is assumed that the server apparatus YAMADA 4 is not connected, in step 2-4, the proxy server 2 makes a call with the telephone number 03-7890-1234 toward the public telephone network 3. When the connection is provided, the server apparatus YAMADA 4 transmits a log-in name and a password. The proxy server apparatus 2 receives the log-in name and the password in step 2-5. Then, the proxy server apparatus certifies the server from the log-in name and the password and assigns one of IP addresses to the server apparatus YAMADA 4 in step 2-6.

The proxy server apparatus 2 assigns the IP address as follows.

At first, the proxy server apparatus 2 checks one of IP address as to whether the IP address is being used. If the IP address is not used, the proxy server apparatus 2 assigns the IP address to the server apparatus 4. For example if the proxy server apparatus 2 holds ten IP addresses from 133.185.001.001 to 133.185.001.010, the IP addresses 133.185.001.003 is not used, the proxy server apparatus 2 assigns this IP address to the server apparatus 4. After assigning the IP address, in step 2-7, the proxy server apparatus 2 tries to establishing the PPP connection with the server apparatus YAMADA. When, the PPP connection has been established, the proxy server apparatus 2 registers the IP address 133.185.001.003 at the column of the IP address at the row of the server apparatus YAMADA 4 in the communication condition control table 200 in step 2-8. In the following step 2-9, the proxy server apparatus 2 effects data communication with the server apparatus YAMADA 4 and transmits a reply to the client terminal 1.

Then, a releasing operation will be described. There are two cases of releasing. That is, releasing is effected by a command from the client terminal 1 and is effected by the server apparatus 4. If the client terminal 1 and the server apparatus communicate with each other one to one and the client terminal 1 decides that there is no necessity in communication with the server apparatus 4, it is possible to disconnect the circuit in response to a command from the client terminal 1. However, if there are a plurality of client terminals communicating with the server apparatus 4, it is prevented from disconnecting the circuit from the server apparatus 4 in response to only the command from one client terminal.

Therefore, in order to control a disconnection from client terminals, the server apparatus 4 comprises a disconnection control portion 40 for controlling disconnection from clients, a timer 41 for measuring an interval of non-communication conditions in the connection conditions every client and a communication condition control table 42 for storing conditional data indicative of a communication condition or a non-communication condition and a continues non-communication interval for every registered client.

The disconnection control portion 40 of the server apparatus 4 measures non-communication intervals with respect to all clients registered in the communication condition control table 42 using the timer 41 and if all client terminals are in the non-communication condition, the circuit between the proxy server apparatus 2 and the server apparatus 4 is disconnected.

FIG. 4 shows a table of the communication condition control table 42 shown in FIG. 1. The communication condition control table 42 stores conditional data indicative of the communication condition or a non-communication condition and a continuous non-communication interval for every IP address of the registered client. The disconnection control portion 40 of the server apparatus 4 registers an IP address of a client requesting a communication with the server apparatus when the PPP connection is established. If one of the client terminals makes a communication with the server apparatus 4, the disconnection control portion 40 stores data indicative of the communication condition in the column of the communication condition at the row of the client terminal and makes the data of the continuous non-communication interval zero. On the other hand, when the communication has finished, the disconnection control portion 40 stores data indicative of the non-communication condition at the row of the client terminal. Moreover, the disconnection control portion 40 checks the communication conditions every client terminal periodically, for example, every five minutes using the timer 41. Then, the disconnection control portion 40 calculates a continuous non-communication interval for every client terminal in the non-communication condition. If the continuous non-communication interval reaches a predetermined value, for example, sixty minutes, the disconnection control portion 40 judges that the circuit between the proxy server apparatus and the server apparatus 4 is not used. If the circuit is not used, the disconnection control circuit 40 informs the connection control portion 22 of the proxy server apparatus 2 of the disconnection, disconnects the circuit, and erases all data in the disconnection control table 42.

If there is a request for erasing the data about one client terminal in the disconnection control table 42, the disconnection control portion 42 erases only the data about the client terminal in the disconnection control table 42. If there are the request for erasing the data about clients from all client terminals 1, the disconnection control portion 42 can disconnect the circuit between the proxy server apparatus 2 and the server apparatus 4 immediately.

In this embodiment, the clients are controlled with the IP addresses, so that if the same client terminal makes a communication with the server apparatus 4 again, it is unnecessary to increase the row of the disconnection control table. Therefore, the disconnection control table 42 is efficiently controlled.

When the connection condition control portion 22 is informed of the disconnection from the server apparatus 4, the connection condition control portion 22 erases the data in the column of the IP address corresponding to the client terminals.

As mentioned, the server exists beyond a public telephone network and thus, the server is not connected to a network usually through the public telephone network and the proxy server apparatus. Therefore its IP address is not always assigned. However, the client terminal can connect to the server apparatus being informed of the name of the server apparatus through the PPP connection because one of IP addresses held by the proxy server apparatus is dynamically assigned to the server apparatus.

Moreover, if there is no access to the server apparatus 4 from a plurality of client terminals for a predetermined interval, the server apparatus 4 can automatically disconnect the telephone circuit after informing the proxy server apparatus 2 of disconnection, so that a telephone charge for the server apparatus is saved.

<Second Embodiment>

Figure 5:
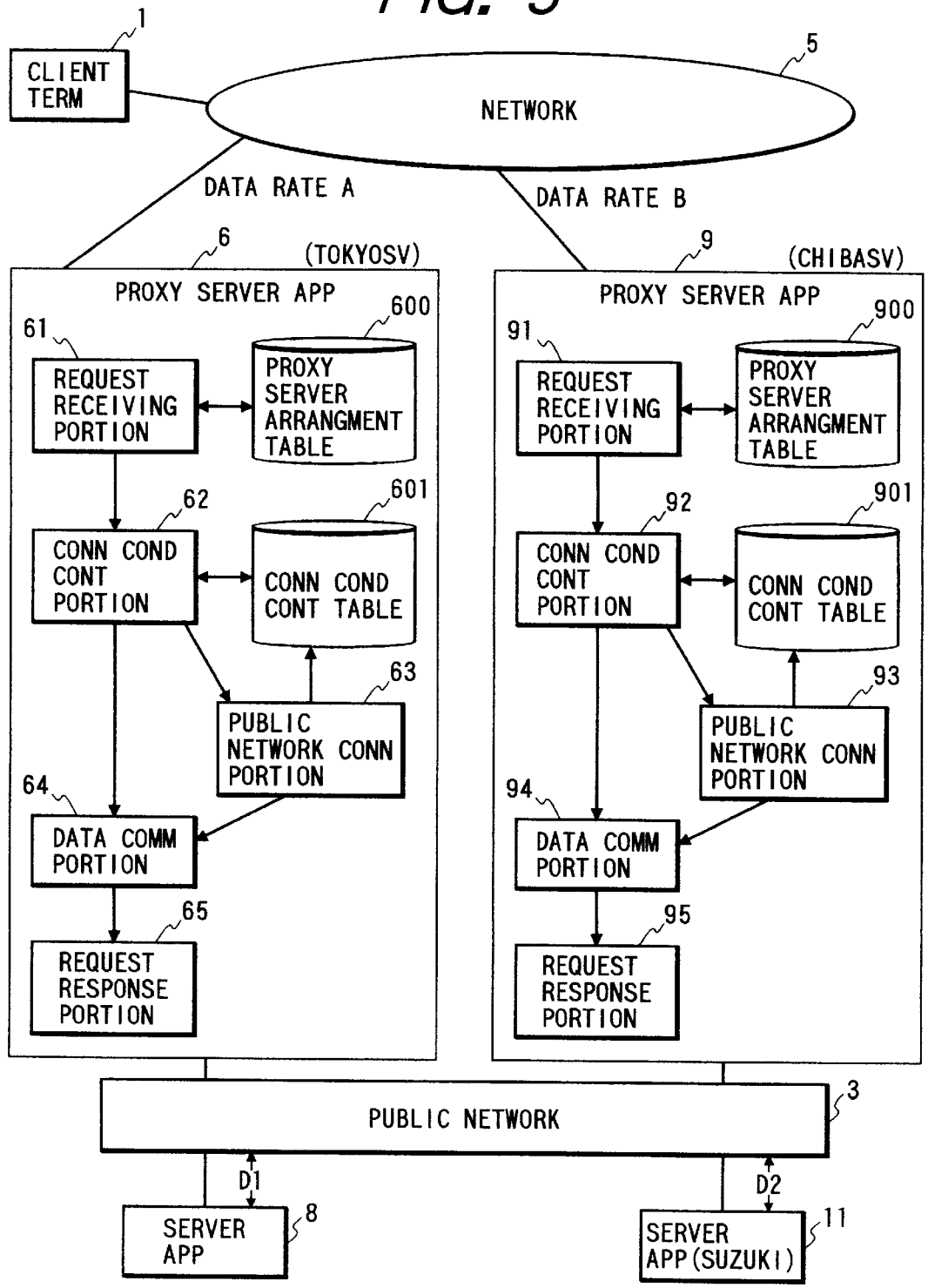
FIG. 5 is a block diagram of a proxy server system of a second embodiment.

FIG. 5 is a block diagram of a proxy server system of a second embodiment.

In the client server system of the second embodiment, there are a plurality of proxy server apparatuses 6 and 9 because there a lot of server apparatuses to be coupled to the network 5 through the proxy server apparatuses 6 and 9. In this case, it is necessary to control connecting operations between the proxy server apparatuses 6 and 9.

The basic structure and operation of the proxy server apparatuses 6 and 9 are similar to those of the first embodiment. The difference is that a plurality of the proxy server apparatus are provided, a request receiving portion 61 or 91 further receives the request for communication with the server apparatuses from other proxy server apparatuses and each proxy server apparatus further comprises a proxy server arrangement table 600 or 900.

A server apparatus 8 is coupled to the network 5 through the public network 3 and the proxy server apparatus 6. A server apparatus 11 is coupled to the network 5 through the public telephone network 3 and the proxy server apparatus 9. The proxy server apparatus 6 controls the server apparatus 8 and the proxy server apparatus 9 controls the server apparatus 11.

An operation will be described.

Figure 6:
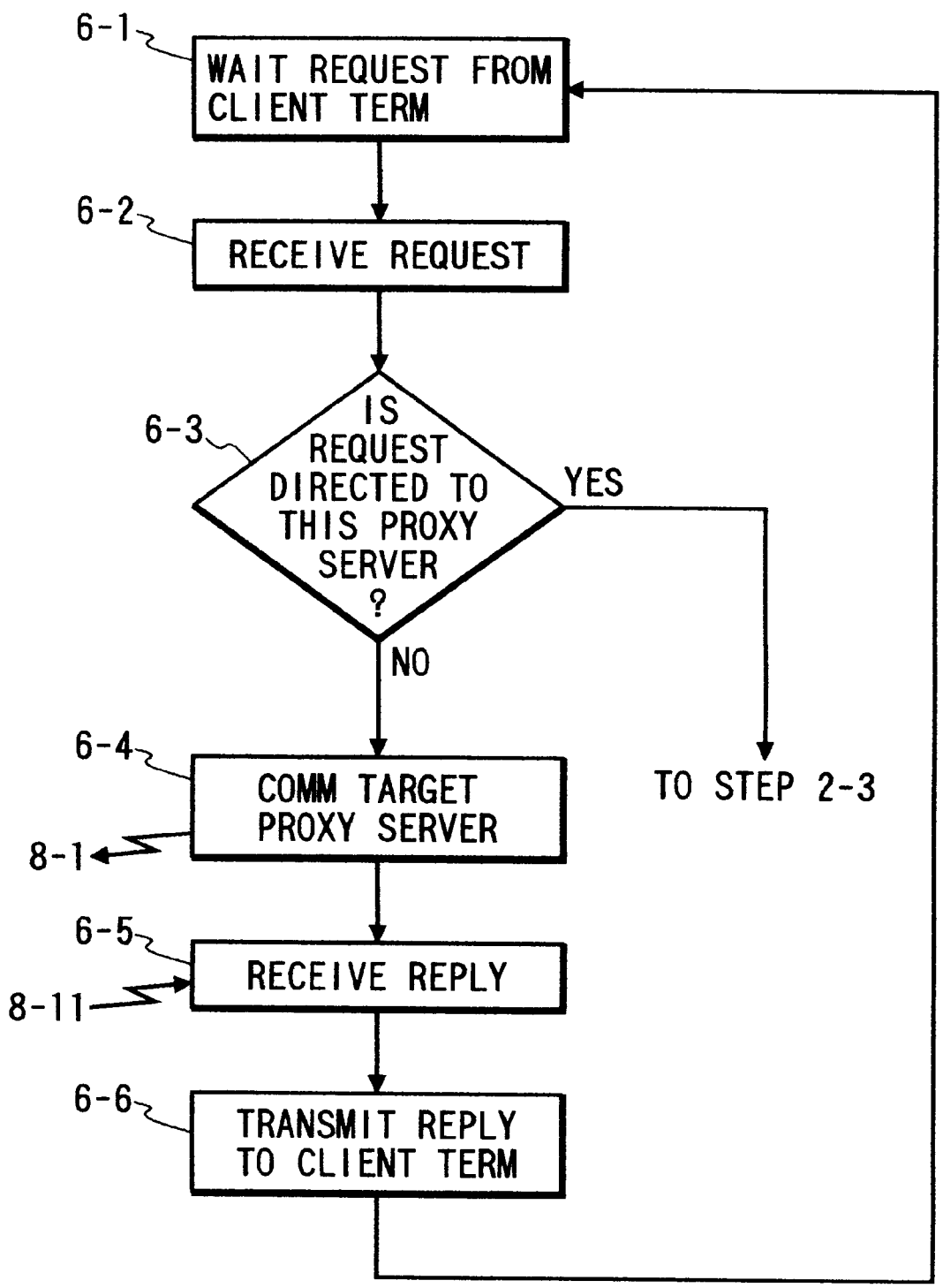
FIG. 6 depicts a flow chart of the second embodiment showing an operation of the proxy server apparatus.
Figure 8:
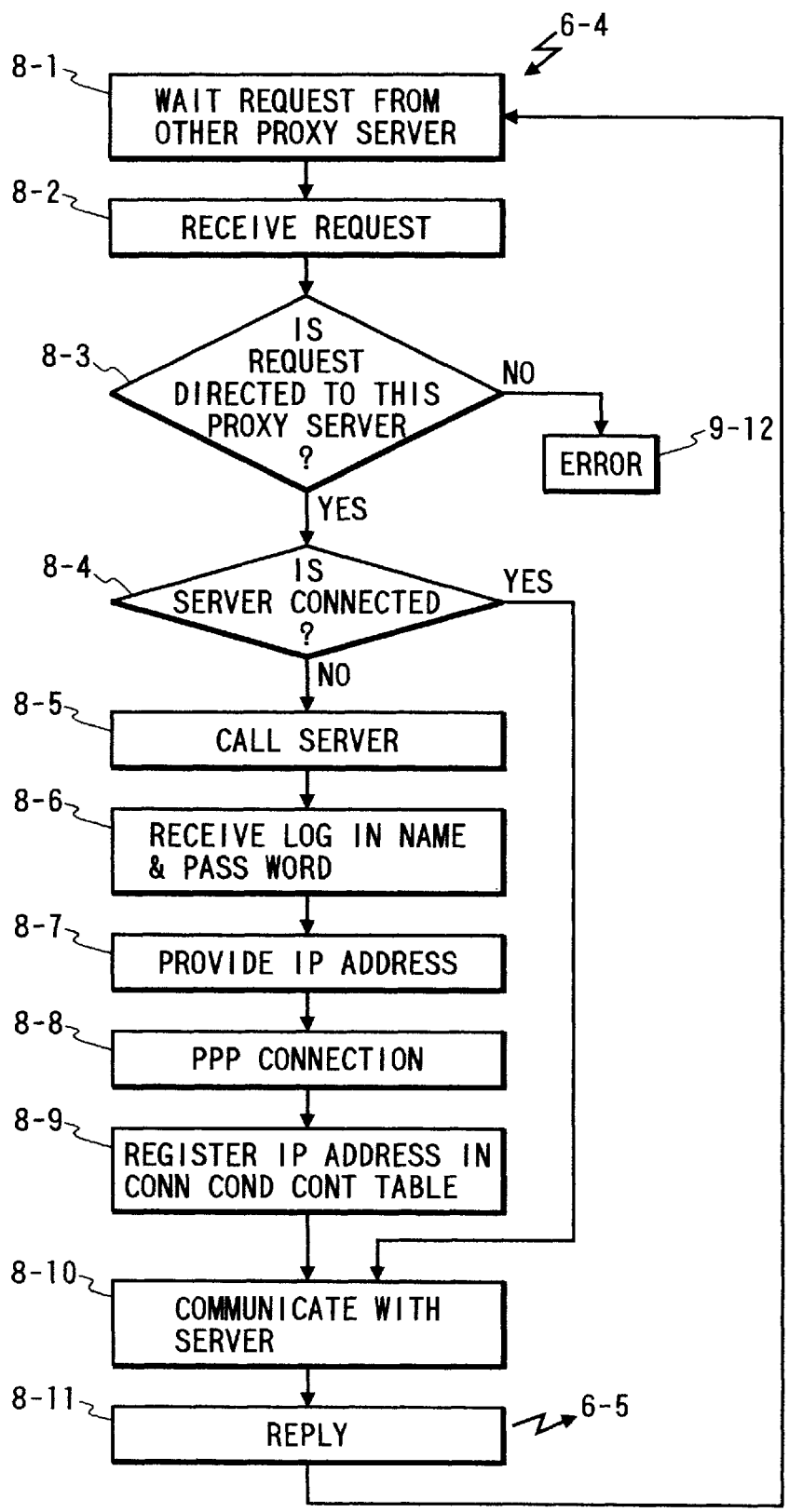
FIG. 8 depicts a flow chart of the second embodiment showing an operation of the proxy server apparatus.

FIG. 6 depicts a flow chart of the second embodiment showing an operation of the proxy server apparatuses 6 or 9 when a communication request is directly transmitted from the client terminal 1. FIG. 7 shows a proxy server apparatus arrangement table shown in FIG. 5. FIG. 8 depicts a flow chart of the second embodiment showing an operation of the proxy server apparatuses 6 or 9 when a communication request is forwarded.

In this embodiment, it is assumed that the proxy server apparatus 6 is named as TOKYOSV, the proxy server apparatus 9 is named as CHIBASV, and the server apparatus 11 is named as SUZUKI.

In step 6-1, the proxy server apparatus 6 waits for a communication request for communicating with the server apparatus 8 from the client terminal 1 connected to the network 5. When there is the communication request with the server apparatus 11 having name SUZUKI, the proxy server apparatus 6 receives the communication request in step 6-2. Then, the proxy server apparatus 6 checks whether the server apparatus SUZUKI 11 is controlled by the proxy server apparatus 6 itself from the proxy server arrangement table 600. If the server apparatus SUZUKI 11 is controlled by the proxy server apparatus 6 itself, processing proceeds to step 2-3 in FIG. 2 to provide the PPP connection as similar to the first embodiment.

In this embodiment, as shown in FIG. 7, the server apparatus SUZUKI 11 is controlled by the proxy apparatus 6. Therefore, processing proceeds to step 6-4. Then, the proxy server apparatus 6 communicates with the proxy server apparatus 9 through the network 5.

The proxy server apparatus 9 receives the request for communication with the server apparatus SUZUKI 11 forwarded by the proxy server apparatus 6 in step 8-2 and makes a decision whether the server apparatus SUZUKI 11 is controlled by the proxy server apparatus 9 itself from the proxy server arrangement table 900. If the server apparatus SUZUKI 11 is controlled by the proxy server apparatus 9 itself, processing proceeds to step 8-4. From step 8-4 to 8-10 or steps 8-4 and 8-10 are executed as similar to steps 2-3 to 2-9 or step 2-3 and 2-9 in the first embodiment.

In step 8-11 following to step 8-10, the proxy server apparatus 9 transmits a replay to the proxy server apparatus 6 including IP address assigned to the server apparatus 11. In response to this, the proxy server apparatus 6 receives this replay from the proxy server apparatus 11 including assigned IP address and forwards the IP address to the client terminal 1 in step 6-6. Then, the client terminal 1 can communicate with the server apparatus 11 through the proxy server apparatus 9 via the proxy server apparatus 6 and the public telephone network 3 with the IP address assigned by the proxy server apparatus 9. The IP address of the proxy server apparatus 9 is also transmitted.

According to this structure, a communication service between the client terminal 1 and the server 11 can be adaptively provided. For example, if the server apparatus 11 and the proxy server 9 are located in CHIBA prefecture and the proxy server apparatus 6 is located in TOKYO which is slightly distant from CHIBA prefecture, it is good for the client terminal 1 (in CHIBA) to communicate with the server apparatus 11 through the proxy server 9 (in CHIBA) rather than the proxy server apparatus 6 (in TOKYO) because a distance in the public network 3 is shorter and thus, the telephone charge is cheaper. That is, in this system, the proxy server apparatus arrangement table 600 or 900 is determined in accordance with distances D1 and D2 in the public telephone network 3 between the server apparatus and the proxy server apparatus 6 or 9. However, if telephone charge is fixed irrespective of a distance, in consideration of data rate of the proxy server apparatus DATA RATE A or DATA RATE B, the proxy server apparatus arrangement table is determined in accordance with a data rate. Generally, the telephone charge increases with the distance in the public network 3, so that the distance is also important parameter. Then, the proxy server apparatus arrangement table is determined in accordance with the data rates and distances in the public telephone network between the server apparatus and the plurality of proxy server apparatus.

What is claimed is:

1. A proxy server apparatus coupled to a network and a public telephone network, said proxy server apparatus comprising:

receiving means for receiving a request from a client terminal coupled to said network, for connection to a desired server apparatus via said public telephone network, said request including a name of said server;

an address table for storing a name and corresponding telephone number;

point-to-point protocol connection means for dynamically assigning an Internet protocol address from predetermined Internet protocol addresses used in said network to said desired server apparatus from said name in accordance with said address table and releasing said Internet protocol address in response to disconnection request information from said desired server apparatus and for providing point-to-point protocol connection between said desired server apparatus and said proxy server apparatus; and communication providing means for providing communication between said client terminal and said desired server apparatus using said Internet protocol address.

2. A proxy server apparatus coupled to a network controlled with Internet protocol addresses and a public telephone network, said proxy server apparatus comprising:

request receiving means for receiving a request from a client terminal through said network for communicating with a server apparatus to be coupled to a second network through said network and said public telephone network;

a connection condition control table for storing a name of said server apparatus and the corresponding telephone number in said public telephone network and correspondingly storing Internet protocol addresses while said server apparatus is connected thereto;

connection condition controlling means for checking whether a server apparatus is connected to said network in accordance with said connection condition control table and for receiving a disconnection request from said server apparatus and releasing said Internet protocol addresses corresponding to said server apparatus;

point-to-point protocol connection means for dynamically assigning one of said Internet protocol addresses to said server apparatus if said server apparatus is not being connected to said network by checking said connection condition controlling means and for providing a point-to-point connection if said server apparatus is not being connected to said network;

data communication means for providing data communication with said server apparatus with the dynamically assigned said one of Internet protocol addresses; and request response means for transmitting a communication result from said data communication means as a reply in response to said communication request to said client terminal.

3. A proxy server system including a plurality of proxy server apparatuses coupled to a network controlled with Internet protocol addresses and a public telephone network, each proxy server apparatus comprising:

a proxy server apparatus arrangement table for representing corresponding relations between names of a plurality of server apparatuses and names of a plurality of server apparatuses in charge of said plurality of proxy server apparatuses;

receiving means for receiving a request from a client terminal coupled to said network directly or via one of said plurality of proxy server apparatuses for connection to one of said plurality of server apparatuses;

forwarding means for forwarding a request to one of said proxy server apparatuses in charge of one of said plurality of server apparatuses through said network in accordance with said proxy server apparatus arrangement table when said one of said plurality of server apparatuses is not in charge of a requested proxy server apparatus;

an address table for storing the name and corresponding telephone number of one of said plurality of server apparatuses in charge of a requested proxy server apparatus;

point-to-point protocol connection means for dynamically assigning an Internet protocol address from predetermined Internet protocol addresses to one of said plurality of server apparatuses from a name in accordance with said address table and for providing a point-to-point protocol connection between one of said server apparatuses and a requested proxy server apparatus, when said one of said plurality of server apparatuses is in charge of a requested proxy server apparatus; and communication providing means for providing communication between said client terminal and said one of said plurality of server apparatuses using said Internet protocol address.

4. A proxy server system as claimed in claim 3, wherein said proxy server apparatus arrangement table is determined in accordance with distances in said public telephone network between said server apparatus and said plurality of proxy server apparatuses.

5. A proxy server system as claimed in claim 3, wherein said proxy server apparatus arrangement table is determined in accordance with data rates of said plurality of proxy server apparatuses.

6. A proxy server system as claimed in claim 3, wherein said proxy server apparatus arrangement table is determined in accordance with data rates of said plurality of proxy server apparatuses and distances in said public telephone network between said server apparatus and said plurality of proxy server apparatuses.

7. A proxy server apparatus coupled to a network controlled with Internet protocol addresses and a public telephone network, comprising:

a proxy server apparatus arrangement table for representing corresponding relations between names of said proxy server apparatuses and other proxy server apparatuses coupled to said network and names of a plurality of server apparatuses in charge of said proxy server apparatuses and said other proxy server apparatuses;

receiving means for receiving a request from a client terminal coupled to said network directly or via one of said other proxy server apparatuses, for connection to one of said plurality of server apparatuses;

forwarding means for forwarding a request to one of said other proxy server apparatuses in charge of one of said plurality of server apparatuses through said network in accordance with said proxy server apparatus arrangement table when said one of said plurality of server apparatuses is not in charge of said proxy server apparatus;

an address table for storing the name and corresponding telephone number of one of said plurality of server apparatuses in charge of a proxy server apparatus;

point-to-point protocol connection means for dynamically assigning an Internet protocol address from predetermined Internet protocol addresses to one of said plurality of server apparatuses from a name in accordance with said address table and for providing a point-to-point protocol connection between one of said server apparatuses and a proxy server apparatus, when said one of said plurality of server apparatuses is in charge of a proxy server apparatus; and communication providing means for providing communication between said client terminal and said one of said plurality of server apparatuses using said Internet protocol address.

8. A proxy server system as claimed in claim 7, wherein said communication providing means provides said communication between said client terminal and said one of said plurality of server apparatuses via said another one of said plurality of proxy server apparatuses when said request is from said client terminal via said another one of said plurality of proxy server apparatuses.

9. A proxy server system as claimed in claim 3, wherein said forwarding means is substantially directly connected to said proxy server apparatus arrangement table.

10. A proxy server apparatus as claimed in claim 7, wherein said forwarding means is substantially directly connected to said proxy server apparatus arrangement table.

* * * * *